United States Patent Office 3,606,021
Patented Sept. 20, 1971

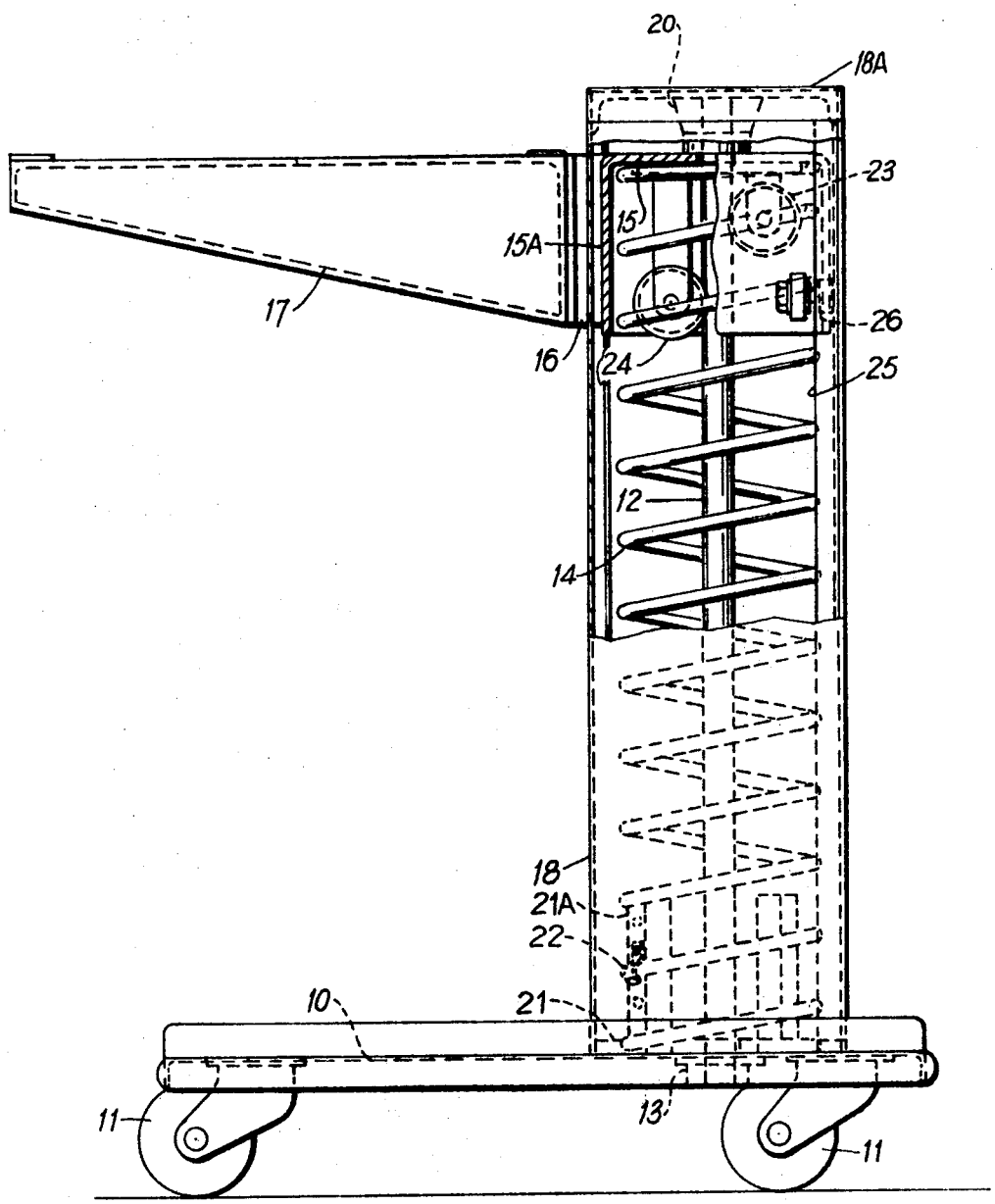

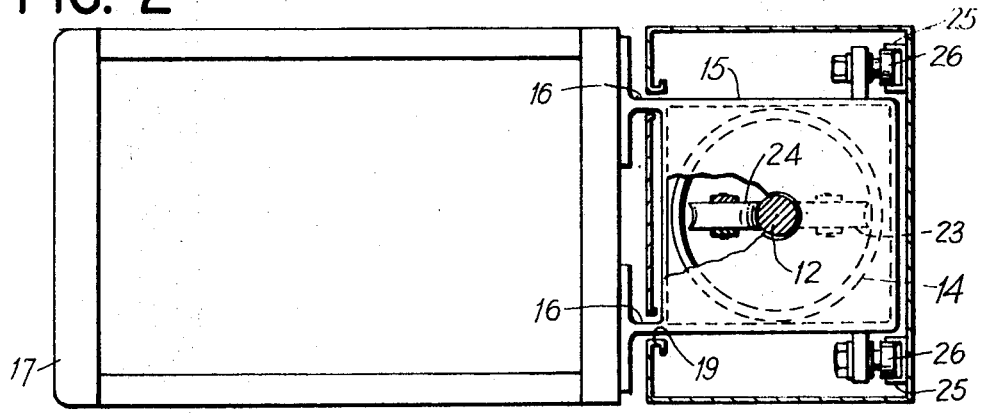
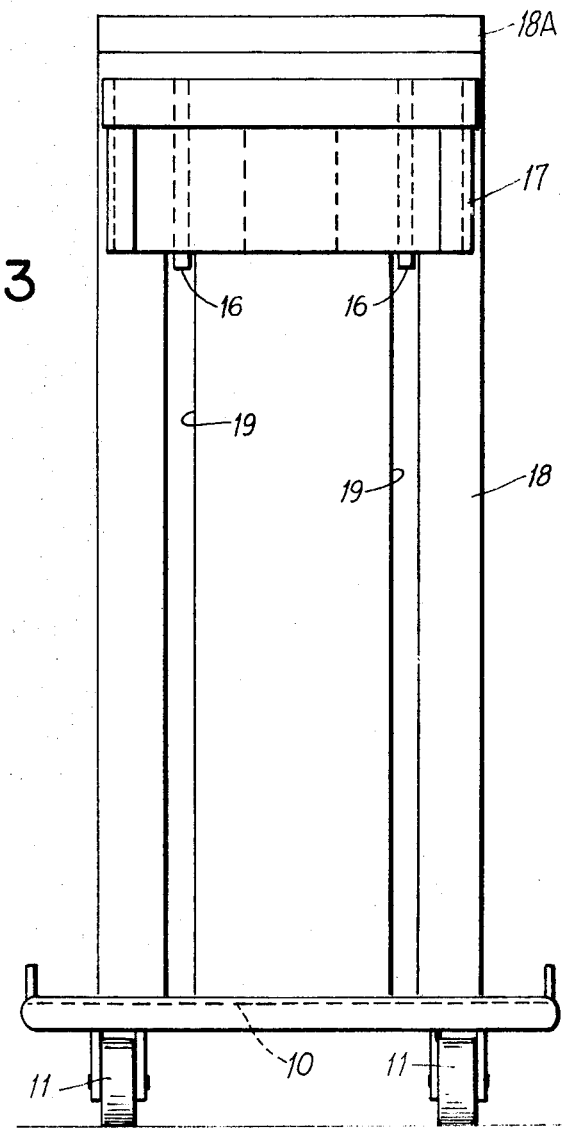

3,606,021
MATERIALS HANDLING APPARATUS
Hans Roels, Dordrecht, Netherlands, assignor to
American Machine & Foundry Company
Filed June 10, 1969, Ser. No. 831,909
Int. Cl. A47f 1/00; B66f 9/00
U.S. Cl. 211—49R                                 2 Claims

ABSTRACT OF THE DISCLOSURE

This invention is for materials handling apparatus wherein an article supporting tray is adapted to move upwardly and downwardly with respect to the base in response to weight of the article on the tray on a calibrated compression spring. The tray is prevented from tilting or rotating in one or more directions by the provision of a guiding member, guiding channel and guiding means.

---

This invention relates to materials handling apparatus. More particularly, the invention relates to improved materials handling apparatus of the type in which a spring supported platform is employed for stacking articles of approximately identical stacking height and weight and in which the spring constant of the supporting spring means is chosen so that the deformation of the spring corresponding to a variation in load equal to the weight of one of the articles is approximately equal to the stacking height of the article.

Generally, in such an apparatus, the platform moves upwardly by a distance nearly equal to the stacking height of the article removed so that the article at the top of the stack always moves into position which is at an approximately constant level when the top article from a stack of articles mounted on the platform is removed. Similarly, when articles are being stacked onto the apparatus the platform and the articles already stacked on the platform are lowered by a distance nearly equal to the stacking height of one of the articles as each new article is placed on top of the stack. The top of the stack is always at approximately the same level and provides a constant stacking surface.

One of the difficulties associated with the construction of materials handling apparatus of the described type is the provision of means for preventing the platform from tilting during load changing. The present invention provides apparatus in which this difficulty is overcome.

According to the invention, there is provided materials handling apparatus comprising a base member, a guiding member such as a column rigidly connected at one end to the base member, a platform member formed with an aperture to receive the guiding member so as to permit the platform member to slide longitudinally along the guiding member, a helical compression spring disposed around the guiding member between the base member and the platform member, and guiding means such as one or more pairs of rollers supported by the platform member for rolling contact with opposite sides of the guiding member to prevent tilting of the platform member, at least in one direction of rotation, about at least one axis perpendicular to the axis of the guiding member.

A tray is supported by a cantilever extending from at least one side of the platform member where at least one pair of rollers are so disposed as to prevent tilting of the platform member and tray when the tray is loaded. A like arrangement may be present on the other side.

The guiding member can be any convenient shape in cross section such as square, round, triangular, octagonal, pentagonal or hexagonal or any other suitable shape and the aperture in the platform will be suitably shaped to be slidably movable thereon. In this connection, the guiding means can also be of various shapes so that they can move along the guiding member as the platform is raised and lowered. Preferably, however, the guiding member is a column of circular cross section and the guiding means are rollers having a rolling surface which is adapted to cooperate with the guiding member.

When the outer periphery of the column is circular in cross-section, rollers having frusto-conical rolling surfaces may be used, and at least one further roller may be mounted on the platform members for rotation about an axis perpendicular to the column axis and for movement between two guides fixed parallel to the column axis, to prevent rotation of the platform around the column.

An embodiment of the invention is described below, by way of example, with reference to the accompanying drawings, wherein:

FIG. 1 is a side elevation of apparatus in accordance with the invention;

FIG. 2 is a plan view partially in section of the apparatus shown in FIG. 1; and FIG. 3 is an end elevation of the apparatus shown in FIGS. 1 and 2.

As shown in the drawings, the apparatus has a horizontal base member 10 and four wheels 11. The base member 10 is apertured to receive a vertical tubular column 12 of annular cross-section, although it may be any other suitable shape. The lower end of the column 12 is a very tight fit in a bushing 13 fastened to the underside of the base member 10 in register with the aperture in the base member.

A helical compression spring 14 is mounted co-axially around the column 12, and at the upper end supports a rectangular platform member 15 which is suitably apertured for sliding movement longitudinally along the column 12. Two cantilevers 16 fastened to each side of the platform member 15 support a tray 17.

A housing 18 of folded sheet metal is fastened at its lower end to the base member 10. This housing 18 is formed with vertical slots 19 (see FIG. 3) to allow longitudinal movement of the cantilevers 16, and is provided at its upper end with a top plate 18A which is fitted on its underside with a bushing 20 which accommodates the upper end of the column 12 with a free fit.

The lower end of the spring 14 rests in a circular groove on an apertured spacing member 21 mounted co-axially with the column 12 on the base member, and is provided with an upstanding portion 21A of annular cross section which serves to locate the bottom end of the spring 14 against lateral movement. The upstanding portion 21A is provided with a plurality of holes for fastening a bracket 22 so as to adjustably clamp part of the spring 14 between the bracket 22 and the upstanding portion 21A and thereby shorten the effective length of the spring 14. Thus, by inactivating part of the turns of the helical spring, the load-deflection ratio of the spring can be effected.

Further control of the movement of the platform member 15 may be effected by inserting semi-annular shims (not shown) between the base member 10 and the spacing member 21. Though not affecting the load-deflection ratio of the spring, such an arrangement serves to pre-compress the helical spring, resulting in the fact that the tray 17 in its highest position will not be lowered, before a certain pre-determined load is applied to the tray. The uper end of the spring 14 is located against lateral displacement by a dependent skirt portion 15A of the platform member 15. This skirt portion 15A is of annular cross-section and encloses the upper end of the spring 14.

To prevent excessive tilting of the platform member 15 and the tray 17, about an axis of rotation perpendicular to the axis of the column 12, as a result of loading the tray 17, two rollers 23 and 24 are suitably mounted, such as by yokes or other suitable means fixed to the underside of the platform member within the space enclosed by the skirt portion 15A for rotation about parallel axes perpendicular to the axis of the column 12. These two axes are respectively disposed on the same side and on the opposite side of the column 12 as the tray 17 and are longitudinally spaced along the column 12 so that the roller 23 which is on the opposite side of the column 12 to the tray 17, is higher than the roller 24 which is on the same side of the column of the tray 17. Each of the rollers 23 and 24 has a semi-circular surface of circular revolution rolling surface which bears against the column 12 to provide a reaction moment balancing the turning movement of the loading on the tray 17.

To prevent excessive rotation of the platform member 15 around the column 12, two vertically disposed channel-section guide members 25 are fastened to the inside surface of the housing 18. Two further rollers 26 are respectively mounted on two laterally opposite sides of the platform member 15 for rotation about parallel axes which are perpendicular to the axis of the column 12 and for movement between the walls of the channel-section guide members 25. Rotation of the platform member 15 is thus limited as a result of engagement between the further rollers 26 and the side walls of the channel-sectioned members 25. Each of the rollers 23, 24 and 25 may be mounted on ball bearings so as to facilitate rotation.

Apparatus constructed in accordance with the invention has many advantages. For example, only one column is necessary and this is designed to transmit all loading on the tray 17 to the base member 10, tilting of the tray under load is prevented by the use of the rollers bearing on the column. In addition, excessive rotation of the platform member is prevented by the use of the rollers and the channel-section guide members. Moreover, only one spring is necessary and the housing for this spring need only be slightly larger than the outer dimensions of the spring. Many other advantages of this invention will be readily apparent to those skilled in the art.

Numerous modifications of this invention may be made without departing from the spirit and scope thereof. Accordingly, this invention is not to be limited except as defined in the appended claims.

What is claimed is:

1. Materials handling apparatus comprising a base member, a substantially vertically disposed guiding member mounted on said base member, a plurality of vertically oriented panels surrounding said guiding member, one of the panels of said base member having channel means connected to the surface thereof facing said guiding member, and the panel opposite the panel having the channel means connected thereto having at least one vertical slot, a platform disposed above said base member, said platform having a depending skirt and an aperture and being longitudinally slidably engaged with said guiding member, a calibrated compression spring disposed substantially vertically between said base member and said platform and around said guiding member for spring supporting the platform, at least one supporting member attached to the skirt of said platform and extending through the slot in said opposite panel and having materials supporting means attached thereto exterior of the opposite panel, at least one pair of rollers attached to the bottom surface of said platform and in contact with vertically spaced diametrically opposite points on said guiding member and at least one roller attached to the skirt of said platform and movable against the channel means, thereby preventing tilting of said platform with respect to the plane in which it lies and rotation of said platform around said guiding member.

2. Materials handling apparatus comprising a rectangular base member, a vertically disposed column of circular cross-section located near one end of said base member, a plurality of vertical panels surrounding and enclosing said column, at least one of said panels having parallel vertical channels located on its inner surface, the panel directly opposite said panel having vertical channels having two vertical slots therein and being located on said base member so a substantial portion of said base member is not enclosed by said panels, an apertured platform having a depending skirt disposed and longitudinally slidable on said column within the space defined by said plurality of panels, a calibrated compression spring located in said space, around said column and between said base member and said platform, a pair of supporting members attached to said platform and extending through the vertical slots in the slotted panel, said supporting members having material supporting means attached thereto exterior of the slotted panel, a pair of rollers each having a semi-circular rolling surface of circular revolution, said rollers being supported by the bottom surface of said platform so as to be in contact with points vertically spaced and opposite each other on the circumference of said column, and at least one other roller located on each side of the exterior surface of the skirt of said platform and movable vertically within the channels.

References Cited

UNITED STATES PATENTS

| | | | |
|---|---|---|---|
| 811,651 | 2/1906 | Miller | 108—136X |
| 2,251,876 | 8/1941 | Gibbs | 312—71 |
| 2,662,802 | 12/1953 | Gibbs | 211—49X |
| 2,668,626 | 2/1954 | Stuivenberg | 214—6H |
| 2,692,177 | 10/1954 | Larsen | 312—71 |
| 2,773,604 | 12/1956 | Gruss | 211—49S |
| 2,806,607 | 9/1957 | Karngold | 108—136 |
| 2,926,789 | 3/1960 | Cranmore | 211—49 |
| 3,407,015 | 10/1968 | Silberberg | 312—71 |
| 3,411,464 | 11/1968 | MacKay | 108—136 |

ROY D. FRAZIER, Primary Examiner

A. FRANKEL, Assistant Examiner

U.S. Cl. X.R.

108—136; 312—71